United States Patent
Moon et al.

(10) Patent No.: US 8,929,652 B2
(45) Date of Patent: Jan. 6, 2015

(54) METHOD AND APPARATUS FOR PROCESSING IMAGE

(71) Applicant: Samsung Electronics Co., Ltd., Suwon-si (KR)

(72) Inventors: Young Su Moon, Seoul (KR); Shi Hwa Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 50 days.

(21) Appl. No.: 13/894,523

(22) Filed: May 15, 2013

(65) Prior Publication Data

US 2014/0119649 A1     May 1, 2014

(30) Foreign Application Priority Data

Oct. 29, 2012 (KR) .................. 10-2012-0120584

(51) Int. Cl.
| | |
|---|---|
| *G06K 9/00* | (2006.01) |
| *G06T 5/00* | (2006.01) |
| *G06T 5/40* | (2006.01) |
| *G06T 5/50* | (2006.01) |

(52) U.S. Cl.
CPC . *G06T 5/009* (2013.01); *G06T 5/40* (2013.01); *G06T 5/50* (2013.01)
USPC .......................................................... 382/167

(58) Field of Classification Search
USPC .................. 382/162, 167, 260, 274
See application file for complete search history.

(56) References Cited

U.S. PATENT DOCUMENTS

2008/0219581 A1    9/2008   Albu et al.

FOREIGN PATENT DOCUMENTS

| JP | 2012-124622 | 6/2012 |
|---|---|---|
| KR | 10-0892972 | 4/2009 |
| KR | 10-2009-0111065 | 10/2009 |
| KR | 10-2010-0040651 | 4/2010 |
| KR | 10-2011-0000293 | 1/2011 |

*Primary Examiner* — Duy M Dang
(74) *Attorney, Agent, or Firm* — Staas & Halsey LLP

(57) ABSTRACT

A method and apparatus for processing an image that performs an online brightness change is disclosed, the method including dividing a luminance channel in a reference image and a target image based on a size of a chroma channel, enhancing an image quality of the target image in which the luminance channel is divided, using the reference image in which the luminance channel is divided, enhancing the image quality of an image of the luminance channel divided in the target image, using the enhanced target image of which, and combining the luminance channel of the enhanced target image and the luminance channel of which the image quality is enhanced.

20 Claims, 7 Drawing Sheets

METHOD AND APPARATUS FOR PROCESSING IMAGE

CROSS-REFERENCE TO RELATED APPLICATIONS

This application claims the priority benefit of Korean Patent Application No. 10-2012-0120584, filed on Oct. 29, 2012, in the Korean Intellectual Property Office, the disclosure of which is incorporated herein by reference.

BACKGROUND

1. Field

Example embodiments relate to a method for processing an image that enhances an image quality of an image using a plurality of images under different exposure conditions.

2. Description of the Related Art

When capturing an image with an image capturing apparatus such as a camera under low luminance conditions, such as a dark environment with a relatively low illumination, two types of an image quality degradation issues may arise. A first such issue arises when capturing is performed by setting a long exposure time to achieve a sufficient exposure. As a shutter speed may become longer, motion blur may occur due to shaking of the image capturing apparatus or a motion of an object. A second such issue arises when capturing is performed by setting a short exposure A strong noise may occur in an overall image through amplification of a noise component in a dark image.

To solve the image quality degradation issue of an image captured under the low luminance conditions, technology for removing motion blur and high-efficiency technology for removing noise, and the like, have been developed based on a single resulting image.

Recently, technology for capturing a plurality of images rather than a single image to process the plurality of images through synthesis is being developed. For example, research is being conducted into technology for solving the image quality degradation issue using an image captured under different exposure conditions. Such technology for processing an image may be utilized in image editing to enhance an image quality of an image captured under the low luminance conditions or to achieve a brightness or a color sense for fine art photography.

An image output from an image signal processor (ISP) currently being used extensively may be an image, for example, YCbCr422, obtained by sub-sampling or down-sampling components of a portion of channels, rather than a full color channel image, for example, YCbCr444. Generally, to enhance an image quality of a YCbCr422 image, the YCbCr422 image may be converted to a YCbCr444 image on which image processing is to be performed subsequently, and the image-processed YCbCr444 image may be re-converted to the YCbCr422 image. Nonetheless, there is still a need for a technology for processing the image to deal with such issues, because the process of converting the images may not only be time-consuming but also consume a significant portion of system resources, and cause the image quality degradation issue.

SUMMARY

In an aspect of one or more embodiments, there is provided a method for processing an image, the method including dividing a luminance channel in a reference image and a target image based on a size of a chroma channel, enhancing an image quality of the target image in which the luminance channel is divided, using the reference image in which the luminance channel is divided, enhancing an image quality of an image of the luminance channel divided in the target image, using the target image of which the image quality is enhanced, and combining the luminance channel of the target image of which the image quality is enhanced and the luminance channel of which the image quality is enhanced.

In an aspect of one or more embodiments, there is provided a method for processing an image, the method including dividing a luminance channel in a reference image and a target image based on a size of a chroma channel, converting a color space of the reference image in which the luminance channel is divided and the target image in which the luminance channel is divided, enhancing an image quality of the target image of which the color space is converted, using the reference image of which the color space is converted, re-converting the color space of the target image of which the image quality is enhanced to an original color space, enhancing an image quality of the image of the luminance channel divided in the target image, using the target image of which the color space is re-converted, and combining the luminance channel of the target image of which the image quality is enhanced and the luminance channel of which the image quality is enhanced.

In an aspect of one or more embodiments, there is provided an apparatus for processing an image, the apparatus including a luminance channel dividing unit to divide a luminance channel in a reference image and a target image based on a size of a chroma channel, an image quality enhancing unit to enhance an image quality of the target image in which the luminance channel is divided, using the reference image in which the luminance channel is divided, and enhance an image quality of an image of the luminance channel divided in the target image, using the target image of which the image quality is enhanced, and a luminance channel combining unit to combine the luminance channel of the target image of which the image quality is enhanced and the luminance channel of which the image quality is enhanced through being divided in the target image.

In an aspect of one or more embodiments, there is provided an apparatus for processing an image, the apparatus including a luminance channel dividing unit to divide a luminance channel in a reference image and a target image based on a size of a chroma channel, a color space converting unit to convert a color space of the reference image in which the luminance channel is divided and the target image in which the luminance channel is divided, an image quality enhancing unit to enhance an image quality of the target image of which the color space is converted, using the reference image of which the color space is converted, and enhance an image quality of an image of the luminance channel divided in the target image, using the target image of which the image quality is enhanced, and a luminance channel combining unit to combine the luminance channel of the target image of which the image quality is enhanced and the luminance channel of which the image quality is enhanced through being divided in the target image.

According to an aspect of one or more embodiments, there is provided at least one non-transitory computer readable medium storing computer readable instructions to implement methods of one or more embodiments.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
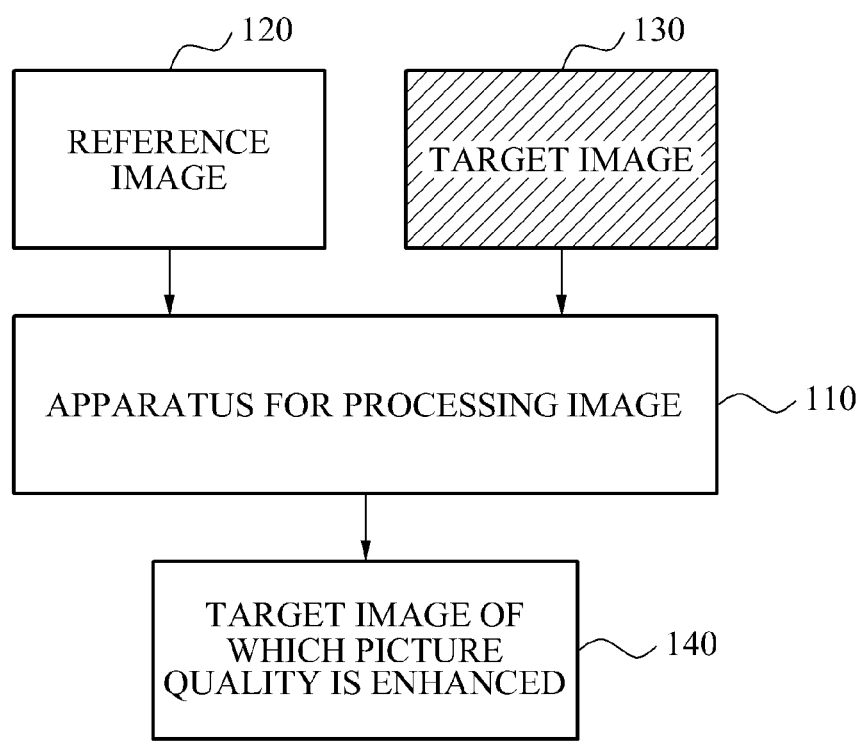
FIG. 1 illustrates an overall operation in which an apparatus for processing an image enhances an image quality of a target image according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an overall operation in which an apparatus 110 for processing an image enhances an image quality of a target image 130 according to example embodiments.

Referring to FIG. 1, the apparatus 110 for processing the image may perform image processing using a reference image 120 and the target image 130, and output a target image 140 of which the image quality is enhanced. The apparatus 110 for processing the image may use at least one reference image 120 or at least one target image 130, and remove noise from the target image 130 using motion information estimated from a plurality of target images 130. Hereinafter, however, descriptions will be provided based on a single reference image 120 and a single target image 130 for ease of description and conciseness.

The reference image 120 may refer to an image captured over a relatively long exposure time when compared to the target image 130. Accordingly, the reference image 120 may be brighter than the target image 130 or have a superior color sense to the target image 130, despite an issue of motion blur being present.

The target image 130 may refer to an image of an object on which image processing is to be performed, and an image captured over a relatively short exposure time when compared to the reference image 120. Accordingly, the target image 130 may be less bright than the reference image 120 or have a distorted color sense despite being a detailed image with less motion blur.

The reference image 120 and the target image 130 may include a luminance channel and a chroma channel. For example, a format of the reference image 120 and the target image 130 may be a color space of YCbCr, and include a single luminance channel, being a Y channel, and two chroma channels Cb and Cr.

The apparatus 110 for processing the image may enhance an image quality of the target image 130 that is less bright or has a distorted color sense, using a brightness or the color sense of the reference image 120. Through image processing being performed as described above, the apparatus 110 for processing the image may perform image processing by dividing the luminance channel configuring the reference image 120 and the target image 130. By way of the dividing, the apparatus 110 for processing the image may enhance the image quality of the target image 130 without performing an additional format converting process.

For example, the apparatus 110 for processing the image may enhance the image quality of the target image 130 without converting a YCbCr422 format to a YCbCr444 format although the reference image 120 and the target image 130 in the YCbCr format are input into the apparatus 110 to undergo image processing, and output the target image 140 in the YCbCr422 format of which the image quality is enhanced.

In the preceding example, the reference image 120 and the target image 130 in the YCbCr422 format are described, however, the apparatus 110 for processing the image may perform image processing through inputting the reference image 120 and the target image 130 in a YCbCr420 format, a YCbCr411 format, and the like.

A decreased image processing time and an economical use of system resources may be possible because performing of the additional format converting process with respect to an input image is omitted by the apparatus 110 for processing. Transitively, the apparatus 110 for processing the image may solve an image quality degradation issue occurring in the format converting process of an image, and minimize a calculation load in performing the image processing.

The apparatus 110 for processing the image may be equipped to a camera, a mobile phone camera, a tablet personal computer (PC), a PC, and the like internally or externally. A method for processing an image performed by the apparatus 110 for processing the image may be applied to augmented reality (AR) glasses in a form of a future head mount display (HMD) or an AR windshield in a form of an intelligent heads-up display (HUD).

Figure 2:
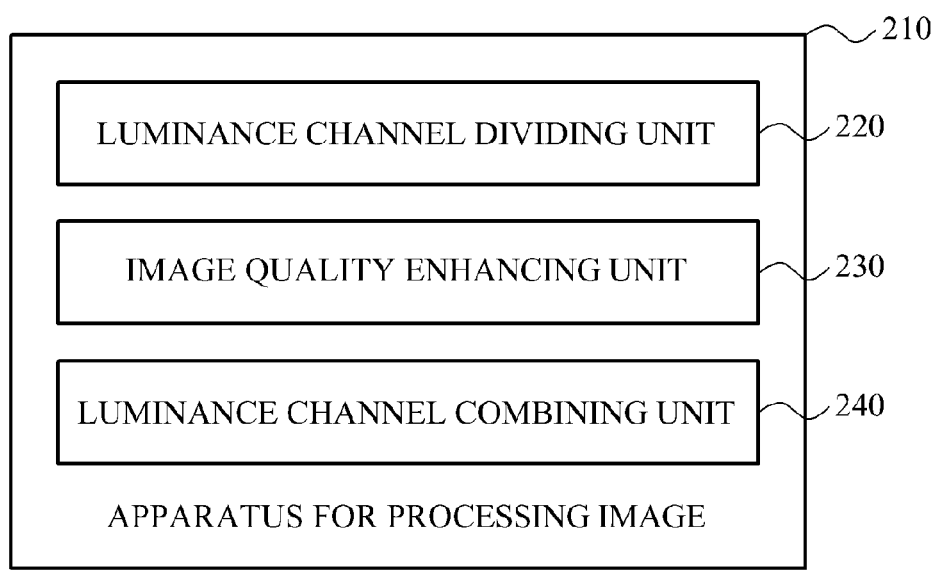
FIG. 2 illustrates a detailed configuration of an apparatus for processing an image according to example embodiments.

FIG. 2 illustrates a detailed configuration of an apparatus 210 for processing an image according to example embodiments.

Referring to FIG. 2, the apparatus 210 for processing the image may include a luminance channel dividing unit (luminance channel divider) 220, an image quality enhancing unit (image quality enhancer) 230, and a luminance channel combining unit (luminance channel combiner) 240.

The luminance channel dividing unit 220 may divide a luminance channel in a reference image and a luminance channel in a target image based on a size of a chroma channel. A size of the luminance channel and a size of the chroma channel may be a relative concept between the luminance channel and the chroma channel and indicate a size of a channel image, an area, a number of channels included per unit pixel, a number of channels sampled or displayed for a predetermined period of time.

The luminance channel dividing unit 220 may divide the luminance channel of the reference image and the luminance channel of the target image to provide a luminance channel having a size identical to the size of the chroma channel to be included in the reference image and the target image.

For example, when the reference image and the target image in the YCbCr 422 format are input, the luminance channel dividing unit 220 may divide the luminance channel, being a Y channel, into two luminance channels, of which a size is "2" based on a size "2" of chroma channels Cb and Cr, in the reference image and the target image.

As another example, when the reference image and the target image in a YCbCr420 or a YCbCr411 format are input, the luminance channel dividing unit 220 may divide a Y channel into a Y channel of which a size is "1" and a Y channel of which a size is "3" based on size "1" of the channels Cb and Cr in the reference image and the target image.

When dividing the luminance channel, the luminance channel dividing unit 220 may divide the luminance channel into two luminance channels by sampling components of the luminance channel in an alternating manner. The luminance channel dividing unit 220 may perform the sampling in an alternating manner on the components of the luminance channel based on a column direction, a row direction, or column and row directions both in an image of the luminance channel.

For example, the luminance channel dividing unit 220 may generate a single luminance channel by sampling the components of the luminance channel in an odd numbered column or row, and generate another luminance channel by sampling the components of the luminance channel in an even numbered column or row. When the reference image and the target image in the YCbCr420 format or the YCbCr411 format are input, the luminance channel dividing unit 220 may perform the sampling on the components of the luminance channel in an alternating manner based on both the column and the row directions.

Through the aforementioned process performed by the luminance channel dividing unit 220, the reference image and the target image including a luminance channel in a size identical to a size of the chroma channel, for example, a YCbCr222 color image, and the luminance channel, being a Y mono image, divided in the reference image and the target image may be generated.

The image quality enhancing unit 230 may enhance an image quality of the target image in which the luminance channel is divided using the reference image in which the luminance channel is divided. The image quality unit 230 may enhance the image quality of the target image in which the luminance channel is divided using a brightness or a color sense of the reference image in which the luminance channel is divided.

More particularly, the image quality enhancing unit 230 may use a brightness change relationship between the reference image in which the luminance channel is divided and the target image in which the luminance channel is divided, and the brightness change relationship may be derived from a histogram matching. For example, the image quality enhancing unit 230 may calculate a histogram of the reference image in which the luminance channel is divided and the target image in which the luminance channel is divided, calculate a cumulative histogram based on the calculated histogram, and perform a brightness change mapping based on the cumulative histogram.

The image quality enhancing unit 230 may enhance an image quality of the target image in which the luminance channel is divided using a brightness change relationship model calculated in real time. Through this, the target image in which the luminance channel is divided may have an image quality similar to an image quality of the reference image in which the luminance channel is divided.

Alternatively, the image quality enhancing unit 230 may enhance the image quality of the target image in which the luminance channel is divided using the brightness change relationship derived from calibration. For example, the image quality enhancing unit 230 may enhance the image quality of the target image in which the luminance channel is divided using the brightness change model stored in a form of a lookup table (LUT).

When a process of enhancing the image quality of the target image is completed, the image quality enhancing unit 230 may enhance an image quality of an image of the luminance channel divided in the target image using the target image of which the image quality is enhanced.

More particularly, the image quality enhancing unit 230 may enhance the image quality of the image of the luminance channel divided in the target image using brightness or color sense information of the luminance channel included in the target image of which the image quality is enhanced. The image quality enhancing unit 230 may enhance the image quality of the image of the luminance channel divided in the target image using a scheme identical to a scheme for enhancing the image quality of the target image in which the luminance channel is divided.

For example, the image quality enhancing unit 230 may use the brightness change relationship between the luminance channel included the target image of which the image quality is enhanced and the luminance channel divided in the target image to enhance the image of the luminance channel divided in the target image, and use the histogram matching scheme or the LUT.

According to another embodiment, the image quality enhancing unit 230 may enhance the image quality of the luminance channel divided in the target image using the luminance channel included in the reference image rather than the luminance channel included in the target image.

The luminance channel combining unit 240 may combine the luminance channel of the target image of which the image quality is enhanced, and the luminance channel of which the image quality is enhanced and divided in the target image. More particularly, the luminance channel combining unit 240 may combine the luminance channel of the target image by performing a process of the dividing of the luminance channel performed by the luminance channel dividing unit 220 in reverse.

A target image of which the image quality is enhanced when compared to an original target image may be generated when the luminance channel combining unit 240 combines the luminance channel of the target image of which the image quality is enhanced and the luminance channel of which the image quality is enhanced through being divided in the target image. For example, the apparatus 210 for processing the image may enhance the image quality of the target image without performing a converting on an image format.

Figure 3:
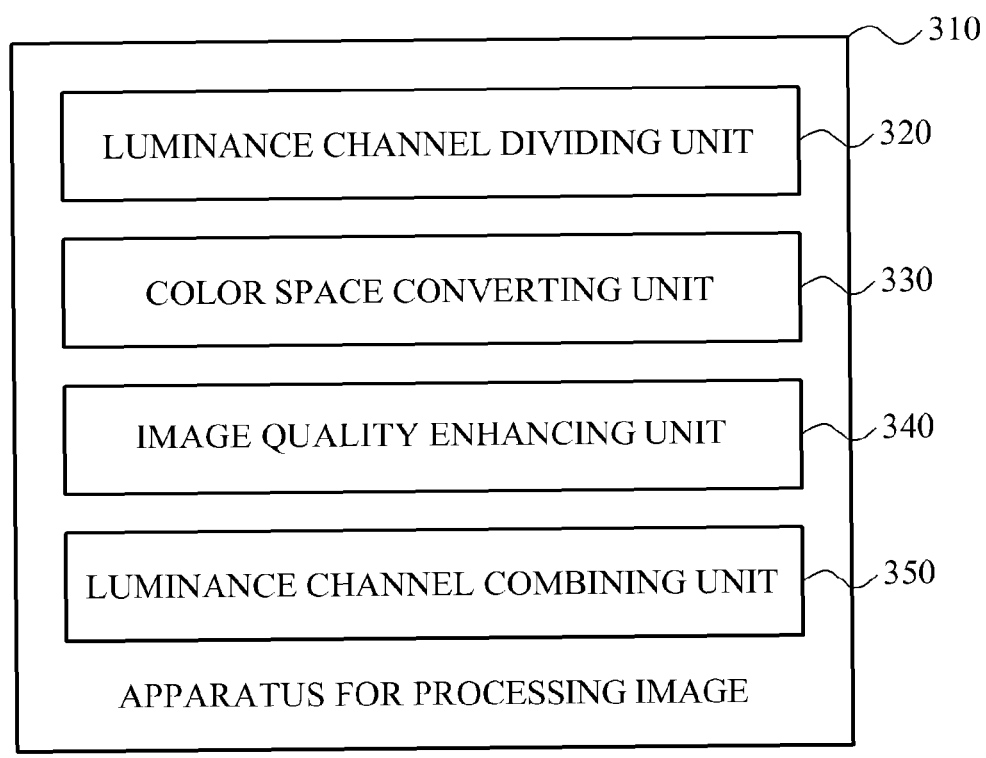
FIG. 3 illustrates a detailed configuration of an apparatus for processing an image according to other example embodiments.

FIG. 3 illustrates a detailed configuration of an apparatus 310 for processing an image according to other example embodiments.

Referring to FIG. 3, the apparatus 310 for processing the image may include a luminance channel dividing unit (luminance channel divider) 320, a color space converting unit (color space converter) 330, an image quality enhancing unit (image quality enhancer) 340, and a luminance channel combining unit (luminance channel combiner) 350.

The luminance channel dividing unit 320 may divide the luminance channel in the reference image and the luminance channel in the target image based on a size of a chroma channel. More particularly, the luminance channel dividing unit 320 may divide the luminance channel in the reference image and the luminance channel in the target image to provide a luminance channel having a size identical to the size of the chroma channel to be included in the reference image and the target image.

For example, when the reference image and the target image in a YCbCr422 format are input, the luminance channel dividing unit 320 may divide the luminance channel, being a Y channel, into two luminance channels, of which a size is "2" based on size "2" of chroma channels Cb and Cr in the reference image and the target image.

As another example, when a reference image and a target image in a YCbCr420 format or a YCbCr411 format are input, the luminance channel dividing unit 320 may divide a Y channel into a Y channel of which a size is "1" and a Y channel of which a size is "3" based on size "1" of the chroma channels Cb and Cr in the reference image and the target image.

The luminance channel dividing unit 320 may divide the luminance channel into two luminance channels by sampling components of the luminance channel in an alternating manner. The luminance channel dividing unit 320 may perform the sampling on the components of the luminance channel in an alternating manner based on a column direction, a row direction, or column and row directions both in an image of the luminance channel.

For example, the luminance channel dividing unit 320 may generate a single luminance channel by sampling the components of the luminance channel in an odd numbered column or row, and generate another luminance channel by sampling the components of the luminance channel in an even numbered column or row.

The color space converting unit 330 may convert a color space of the reference image in which the luminance channel is divided and the target image in which the luminance channel is divided. For example, the color space converting unit 330 may convert the reference image in which the luminance channel is divided and the target image in which the luminance channel is divided in a YCbCr format into an image of another color space including a red, green, blue (RGB) format, an International Commission on Illumination (CIE) format, and the like. The color space converting unit 330 may re-convert an image in the RGB format, the CIE format, and the like, into an image in the original YCbCr format. The color space converting unit 330 may perform a format converting on the image using a color space converting formula.

The image quality enhancing unit 330 may perform an image processing in an area of the RGB format superior to the YCbCr format in terms of restoring a color sense of the target image, through converting the target image in which the luminance channel is divided in the YCbCr format into the image in the RGB format, and the like, performed by the color space converting unit 330. Upon the image quality enhancing unit 340 completing a process of enhancing the image quality of the target image in which the luminance channel is divided, the color space converting unit 330 may re-convert the target image of which the image quality is enhanced in the RGB format into the image in the YCbCr format.

The image quality enhancing unit 340 may enhance the image quality of the target image of which the color space is converted, using the reference image of which the color space is converted. For example, the image quality enhancing unit 340 may enhance the image quality of the target image based on the reference image and the target image of which the image in the YCbCr format is converted to the image in the RGB format. The image quality unit 340 may enhance the image quality of the target image of which the color space is converted, using brightness or color sense information of the reference image of which the color space is converted.

The image quality enhancing unit 340 may use a brightness change relationship between the reference image of which the color space is converted and the target image of which the color space is converted, and the brightness change relationship may be derived from a histogram matching. For example, the image quality enhancing unit 340 may calculate a histogram of the reference image of which the color space is converted and the target image of which the color space is converted, calculate a cumulative histogram based on the calculated histogram, and perform a brightness change mapping based on the cumulative histogram.

The image quality enhancing unit 340 may enhance an image quality of the target image of which the color space is converted, using a brightness change relationship model calculated in real time. Transitively, the target image of which the color space is converted may have an image quality similar to an image quality of the reference image of which the color space is converted. Alternatively, the image quality enhancing unit 340 may enhance the image quality of the target image of which the color space is converted, using the brightness change relationship derived from calibration or an LUT.

As described above, when the image quality enhancing unit 340 completes a process of enhancing the image quality of the target image in which the luminance channel is divided, the color space converting unit 330 may re-convert the target image of which the image quality is enhanced in the RGB format into an image in the YCbCr format.

Once the format of the target image of which the image quality is enhanced is re-converted by the color space converting unit 330, the image quality enhancing unit 340 may enhance an image quality of the image of the luminance channel divided in the target image using the target image of which the image quality is enhanced.

More particularly, the image quality enhancing unit 340 may enhance the image quality of the image of the luminance channel divided in the target image using brightness or color sense information of the luminance channel included in the target image of which the image quality is enhanced. The image quality enhancing unit 340 may use the brightness change relationship between the luminance channel included in the target image of which the picture quality is enhanced and the luminance channel divided in the target image to enhance the image of the luminance channel divided in the target image, and use the histogram matching scheme or the LUT.

According to another embodiment, the image quality enhancing unit 340 may enhance the image quality of the luminance channel divided in the target image using the luminance channel included in the reference image rather than the luminance channel included in the target image.

The luminance channel combining unit 350 may combine the luminance channel of the target image of which the image quality is enhanced. More particularly, the luminance channel combining unit 350 may combine the luminance channel of the target image by performing a process of the dividing of the luminance channel performed by the luminance channel dividing unit 320 in reverse.

When the luminance channel combining unit 350 combines the luminance channel of the target image of which the image quality is enhanced, a target image of which the image quality is enhanced compared to an original target image may be generated.

Figure 4:
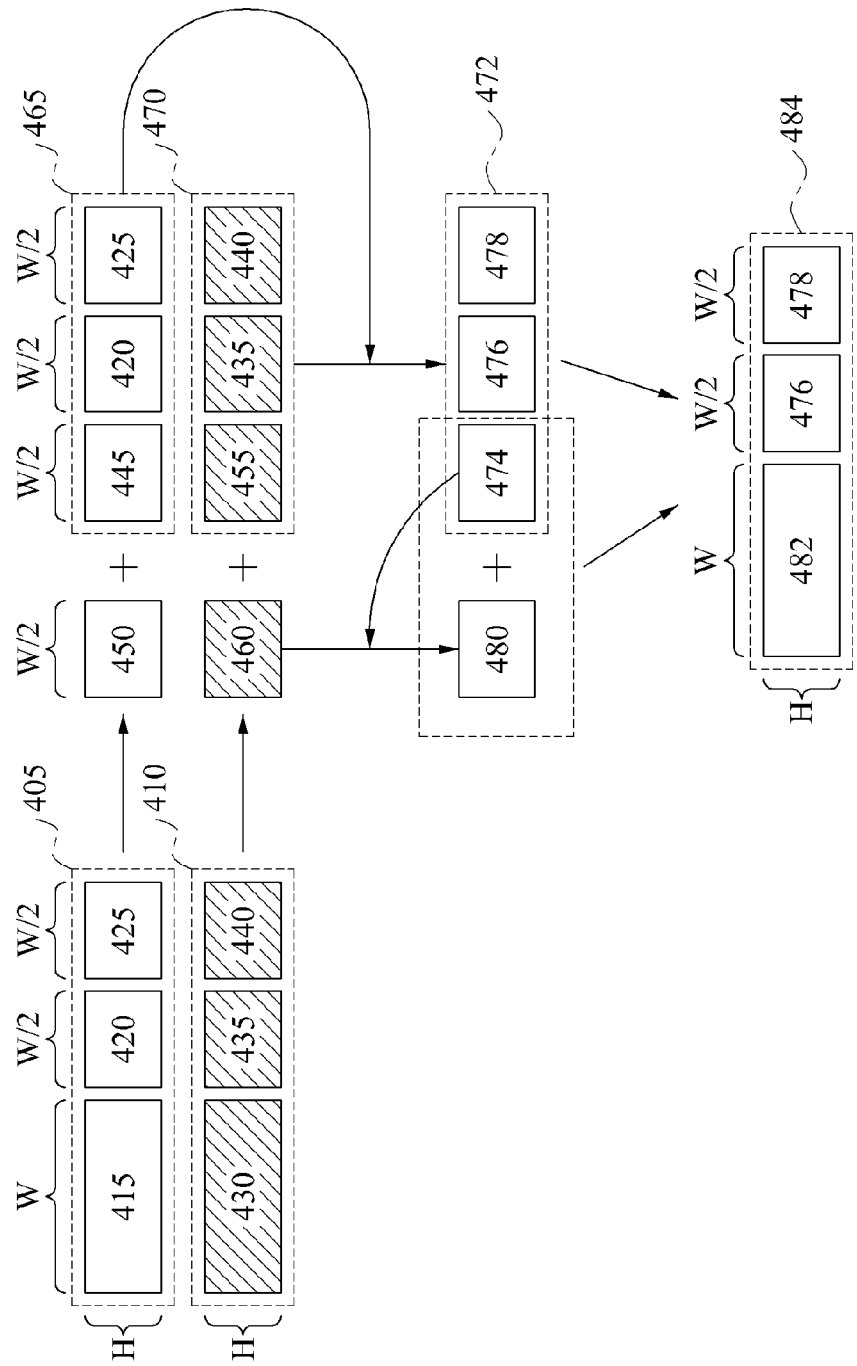
FIG. 4 illustrates an example in which an image quality of a target image is enhanced using a reference image according to example embodiments.

FIG. 4 illustrates an example in which an image quality of a target image 410 is enhanced using a reference image 405 according to example embodiments.

Referring to FIG. 4, a process in which an apparatus for processing an image enhances the image quality of the target image 410 through dividing the luminance channel is illustrated.

For ease of description, it is assumed that the reference image 405 and the target image 410 are in a YCbCr422 format, luminance channels 415 and 430 may display an image of a height H and a width W, and chroma channels 420, 425, 435, and 440 may display an image of a height H and a width W/2.

Here, the width of the chroma channels 415 and 430 is W, the width of the chroma channels 420, 425, 435, and 440 is W/2 and thus, the apparatus for processing the image may divide the luminance channels 415 and 430 of the reference image 405 and the target image 410 for a luminance channel of a size identical to a size of the chroma channels 420, 425, 435, and 440 to be included in the reference image 405 and the target image 410.

Accordingly, the apparatus for processing the image may divide the luminance channels 415 and 430 included in the reference image 405 and the target image 410 into the two luminance channels 445, 450, 455, and 460 having a height H and a width W/2. When the luminance channels 415 and 430 of the reference image 405 and the target image 410 are divided, the reference image (hereinafter referred to as "second reference image 465") and the target image (hereinafter referred to as "second target image 470") including the luminance channel 445 and 455 of a size identical to a size of the chroma channels 420, 425, 435, and 440, and luminance channels 450 and 460 divided in the reference image 405 and the target image 410 may be generated.

The apparatus for processing the image may enhance an image quality of the second target image 470 using brightness or color sense information of the second reference image 465. More particularly, the apparatus for processing the image may enhance the image quality of the second target image 470 using the brightness change relationship between the second reference image 465 and the second target image 470 derived from the histogram matching. Alternatively, the apparatus for processing the image may enhance the image quality of the second target image 470 using the brightness change relationship derived from calibration or the LUT.

The apparatus for processing the image may perform an image processing in a YCbCr422 format without converting the reference image 405 and the target image 410 that are input in order to enhance the image quality of the target image 410 to a YCbCr444 format, being a full color channel.

The second target image (hereinafter referred to as "third target image 472") of which the image quality is enhanced may include a luminance channel 474 of which the image quality is enhanced and the chroma channels 476 and 478. When the image quality of the second target image 470 is enhanced, the apparatus for processing the image may enhance the image quality of the luminance channel 460 divided in the target image 410 using the luminance channel 474 included in the third target image 472. In this instance, the apparatus for processing the image may use the brightness change relationship between the luminance channel 474 included in the third target image 472 and the luminance channel 460 divided in the target image 410, and the brightness change relationship may be based on the histogram matching, the LUT, and the like.

The apparatus for processing the image may generate a single luminance channel 482 by combining the luminance channel 474 included in the third target image 472 and the luminance channel 480 of which the image quality is enhanced, and output a target image 484 of which an overall image quality is enhanced. In this instance, the apparatus for processing the image may combine the luminance channels 474 and 480 of the target image by performing a process of the dividing of the luminance channel performed by the luminance channel dividing unit 320 in reverse.

According to another embodiment, the apparatus for processing the image may convert a color space to enhance the image quality of the target image 410. For example, the apparatus for processing the image may convert a YCbCr422 format of the reference image 405 and the target image 410 into an RGB format, and enhance the image quality of the target image 410 based on the RGB format. The apparatus for processing the image may generate a target image of a relatively superior image quality in terms of a color sense by performing the image processing in the RGB format.

For example, the apparatus for processing the image may convert the second reference image 465 and the second target image 470 to the RGB format, and enhance the image quality of the second target image 470 in an RGB format area. When the image quality of the second target image 470 is enhanced, the apparatus for processing the image may re-convert the format of the third target image 472 of which the image quality is enhanced into the original YCbCr422 format.

When the format of the third target image 472 is re-converted into the original image format, the apparatus for processing the image may enhance the image quality of the image of the luminance channel 460 divided in the target image 410 using the luminance channel 474 included in the third target image 472. When the image quality of the image of the luminance channel 460 divided in the target image 410 is enhanced, the apparatus for processing the image may generate the target image 484 of which an overall image quality is enhanced by combining the luminance channels 474 and 480 of the target image.

Figure 5:
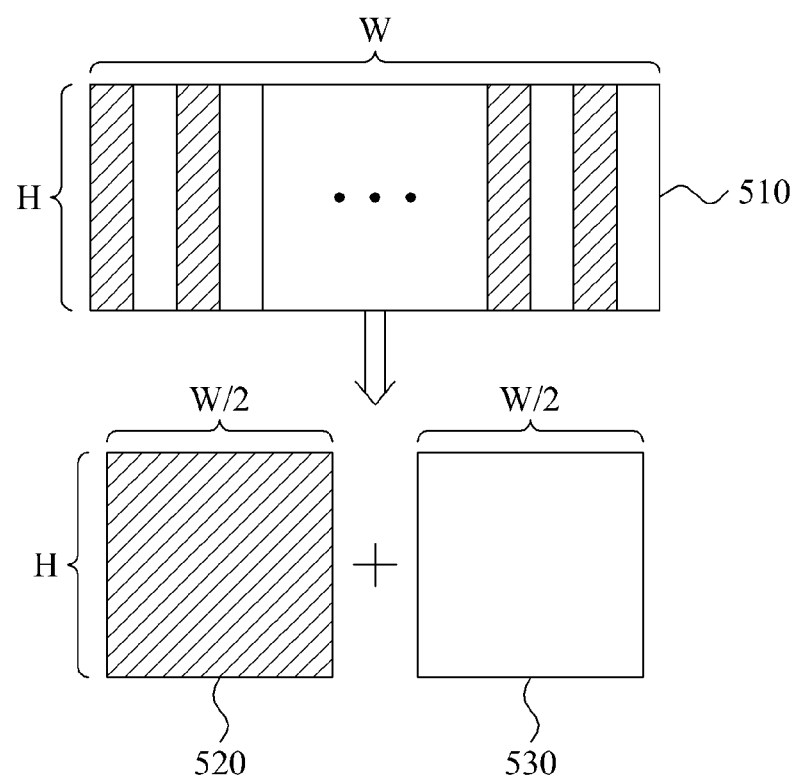
FIG. 5 illustrates an example of dividing a luminance channel according to example embodiments.

FIG. 5 illustrates an example of dividing a luminance channel 510 according to example embodiments.

Referring to FIG. 5, a process in which an apparatus for processing an image divides the luminance channel 510 included in a reference image and a target image is illustrated. For ease of description, it is assumed that the reference image and the target image are in a YCbCr422 format, the luminance channel 510 may display an image of a height H and a width W, and chroma channels may display an image of a height H and a width W/2.

Only the process of dividing the luminance channel 510 of the target image will be described because the luminance channel of the reference image and the target image may be divided, by the same process.

When a chroma channel has a height H and a width W/2 in the target image, the luminance channel 510 may have a height H and a width W. Accordingly, the apparatus for processing the image may divide the luminance channel 510 based on the size of the chroma channel. The apparatus for processing the image may divide the luminance channel for a luminance channel of a size identical to a size of the chroma channel to be included in the target image. Accordingly, the apparatus for processing the image may divide the luminance channel of the target image into two luminance channels 520 and 530 having a height H and a width W/2.

In this instance, the apparatus for processing the image may divide the luminance channel into the two luminance channels 520 and 530 by sampling components of the luminance channel 510 in an alternating manner. A direction at which the apparatus for processing the image performs the sampling may be a column direction, a row direction, or column and row directions both. The apparatus for processing the image may divide the luminance channel 510 by performing the sampling in the column direction because the width of the luminance channel 510 included in the target image is to be decreased from W to W/2.

The apparatus for processing the image may generate the single luminance channel 520 by sampling the components of the luminance channel 510 in an odd numbered column through dividing, in the column direction, the luminance channel 510 included in the target image, and generate the other luminance channel 530 by sampling the components of the luminance channel 510 in an even numbered column. A hatched area in FIG. 5 is illustrated only for ease of description and is not intended to distinguish these areas from other areas.

When a width of the luminance channel included in the target image remains the same, and a height of the luminance channel is to be decreased to H/2, the apparatus for processing the image may perform the sampling on the components of the luminance channel in the row direction.

When a YCbCr420 format or a YCbCr411 format is input, reducing the height and the width of the luminance channel by a factor of one half is required and thus, the apparatus for processing the image may perform the sampling on the components of the luminance channel in the column and the row directions both. In this instance, the apparatus for processing the image may perform the sampling on the components of the luminance channel in the column direction and subsequently in the row direction, or perform the sampling in the row direction and subsequently in the column direction.

Figure 6:
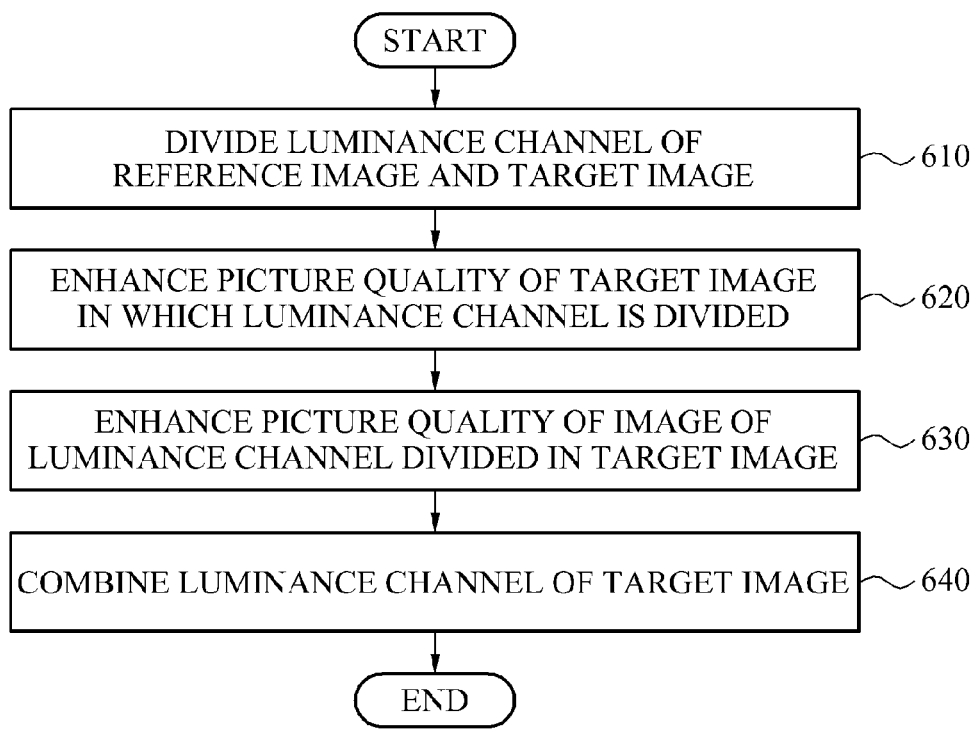
FIG. 6 is a flowchart illustrating a method for processing an image according to example embodiments.

FIG. 6 is a flowchart illustrating a method for processing an image according to example embodiments.

In operation 610, an apparatus for processing an image may divide a luminance channel in a reference image and a luminance channel in a target image based on a size of a chroma channel. The apparatus for processing the image may divide the luminance channel of the reference image and the luminance channel of the target image to provide a luminance channel having a size identical to a size of the chroma channel to be included in the reference image and the target image.

When the apparatus for processing the image divides the luminance channel, the apparatus for processing the image may divide the luminance channel into two luminance channels by sampling components of the luminance channel in an alternating manner. The apparatus for processing the image may perform the sampling on the components of the luminance channel based on a column direction, a row direction, or column and row directions both in an image of the luminance channel.

In operation 620, the apparatus for processing the image may enhance an image quality of the target image in which the luminance channel is divided, using the reference image in which the luminance channel is divided. The apparatus for processing the image may enhance the image quality of the target image in which the luminance channel is divided, using brightness or color sense information of the reference image in which the luminance channel is divided.

More particularly, the apparatus for processing the image may use a brightness change relationship between the reference image in which the luminance channel is divided and the target image in which the luminance channel is divided, and the brightness change relationship may be derived from a histogram matching. Alternatively, the apparatus for processing the image may enhance the image quality of the target image in which the luminance channel is divided, using the brightness change relationship derived from calibration or an LUT.

The apparatus for processing the image may enhance the image quality of the target image in which the luminance channel is divided, using the brightness change relationship between the reference image in which the luminance channel is divided and the target image in which the luminance channel is divided.

In operation 630, the apparatus for processing the image may enhance the image quality of an image of the luminance channel divided in the target image, using the target image of which the image quality is enhanced. The apparatus for processing the image may enhance the image quality of the image of the luminance channel divided in the target image, using the brightness change relationship between the target image of which the image quality is enhanced and the image of the luminance channel divided in the target image. The apparatus for processing the image may enhance the image quality of the image of the luminance channel divided in the target image, using the brightness change relationship derived from the histogram matching.

In operation 640, the apparatus for processing the image may combine the luminance channel of the target image of which the image quality is enhanced. More particularly, the apparatus for processing the image may combine the luminance channel of the target image by performing a process of the dividing of the luminance channel performed by the luminance channel dividing unit 320 in reverse. When the apparatus for processing the image combines the luminance channel of the target image, a target image of which the image quality is enhanced compared to the original target image.

Figure 7:
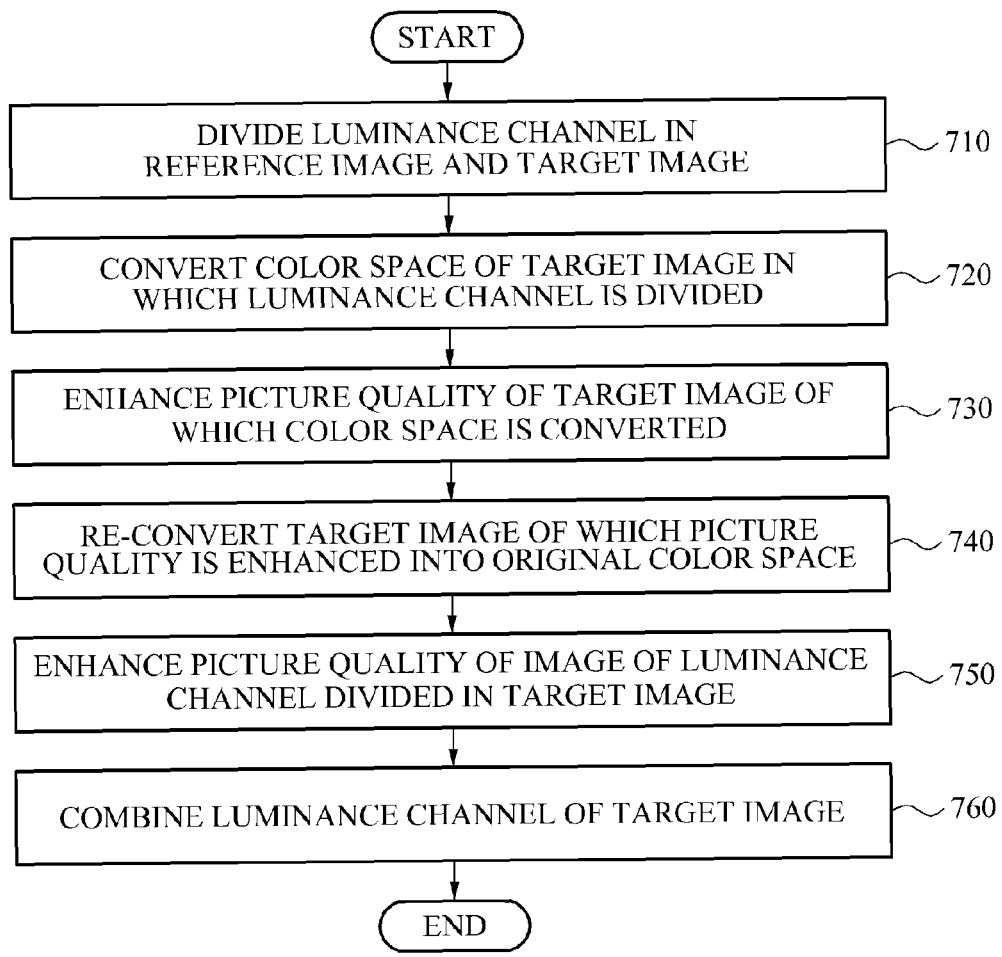
FIG. 7 is a flowchart illustrating a method for processing an image according to other example embodiments.

FIG. 7 is a flowchart illustrating a method for processing an image according to other example embodiments.

In operation 710, an apparatus for processing an image may divide a luminance channel in a reference image and a luminance channel in a target image, based on a size of a chroma channel. The apparatus for processing the image may divide the luminance channel in the reference image and the luminance channel in the target image to provide a luminance channel having a size identical to a size of the chroma channel to be included in the reference image and the target image. The apparatus for processing the image may divide the luminance channel into two luminance channels by sampling components of the luminance channel in an alternating manner.

In operation 720, the apparatus for processing the image may convert a color space of the reference image in which the luminance channel is divided and the target image in which the luminance channel is divided. For example, the apparatus for processing the image may convert the reference image in which the luminance channel is divided and the target image in which the luminance channel is divided in a YCbCr format into an image of another color space including an RGB format, a CIE format, and the like. In this instance, the apparatus for processing the image may use a color space converting formula. Through converting the color space, the apparatus for processing the image may perform an image processing in an area of the RGB format that is superior to the YCbCr format in terms of restoring a color sense of the target image.

In operation 730, the apparatus for processing the image may enhance the image quality of the target image of which the color space is converted, using the reference image of which the color space is converted. The apparatus for processing the image may use a brightness change relationship between the reference image of which the color space is converted and the target image of which the color space is converted, and the brightness change relationship may be derived from a histogram matching. For example, the apparatus for processing the image may calculate a histogram of the reference image of which the color space is converted and the target image of which the color space is converted, calculate a cumulative histogram based on the calculated histogram, and perform a brightness change mapping based on the cumulative histogram.

In operation 740, the apparatus for processing the image may re-convert the color space of the target image of which the image quality is enhanced into the original color space. For example, the apparatus for processing the image may re-convert the target image of which the image quality is enhanced in the RGB format or CIE format into the original YCbCr format.

In operation 750, the apparatus for processing the image may enhance the image quality of the image of the luminance channel divided in the target image, using the target image of which the color space is re-converted.

The apparatus for processing the image may enhance the image quality of the image of the luminance channel divided in the target image, using the brightness change relationship between the target image of which the color space is reconverted and the image of the luminance channel divided in the target image. The apparatus for processing the image may enhance the image quality of the image of the luminance channel divided in the target image, using the brightness change relationship derived from the histogram matching.

According to another embodiment, the apparatus for processing the image may enhance the image quality of the image of the luminance channel divided in the target image, using the luminance channel included in the reference image rather than the luminance channel included in the target image.

In operation 760, the apparatus for processing the image may combine the luminance channel of the target image of which the image quality is enhanced. More particularly, the luminance channel combining unit may combine the luminance channel of the target image by performing a process of the dividing of the luminance channel performed by the luminance channel dividing unit 320 in reverse A portable device as used throughout the present specification includes mobile communication devices, such as a personal digital cellular (PDC) phone, a personal communication service (PCS) phone, a personal handy-phone system (PHS) phone, a Code Division Multiple Access (CDMA)-2000 (1X, 3X) phone, a Wideband CDMA phone, a dual band/dual mode phone, a Global System for Mobile Communications (GSM) phone, a mobile broadband system (MBS) phone, a satellite/terrestrial Digital Multimedia Broadcasting (DMB) phone, a Smart phone, a cellular phone, a personal digital assistant (PDA), an MP3 player, a portable media player (PMP), an automotive navigation system (for example, a global positioning system), and the like. Also, the portable device as used throughout the present specification includes a digital camera, a plasma display panel, and the like.

The method and apparatus for processing the image according to the above-described embodiments may be recorded in non-transitory computer-readable media including program instructions (computer readable instructions) to implement various operations embodied by a computing device such as a computer. The computing device may have one or more processors. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The non-transitory computer-readable media may also be a distributed network, so that the program instructions are stored and executed in a distributed fashion. The program instructions may be executed by one or more processors or processing devices. The computer-readable media may also be embodied in at least one application specific integrated circuit (ASIC) or Field Programmable Gate Array (FPGA). The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method for processing an image, the method comprising:
    dividing a luminance channel in a reference image and a luminance channel in a target image based on a size of a chroma channel using at least one processor;
    enhancing an image quality of the target image in which the luminance channel is divided, using the reference image in which the luminance channel is divided;
    enhancing an image quality of an image of the luminance channel divided in the target image, using the target image of which the image quality is enhanced; and
    combining the luminance channel of the target image of which the image quality is enhanced and the luminance channel of which the image quality is enhanced.

2. The method of claim 1, wherein the dividing of the luminance channel in the reference image and the luminance channel in the target image based on the size of the chroma channel comprises:
    dividing the luminance channel of the reference image and the luminance channel of the target image to provide a luminance channel of a size identical to a size of a chroma channel to be included in the reference image and the target image.

3. The method of claim 2, wherein the dividing of the luminance channel in the reference image and the target image based on the size of the chroma channel comprises:
    dividing the luminance channel into two luminance channels by sampling components of the luminance channel in an alternating manner.

4. The method of claim 1, wherein the enhancing of the image quality of the target image in which the luminance channel is divided comprises:
    enhancing the image quality of the target image in which the luminance channel is divided, using a brightness change relationship between the reference image in which the luminance channel is divided and the target image in which the luminance channel is divided.

5. The method of claim 4, wherein the enhancing of the image quality of the target image in which the luminance channel is divided comprises:
    enhancing the image quality of the target image in which the luminance channel is divided, using a brightness change relationship derived from a histogram matching.

6. The method of claim 1, wherein the enhancing of the image quality of the image of the luminance channel divided in the target image comprises:
    enhancing the image quality of the luminance channel divided in the target image, using a brightness change relationship between the target image of which the image quality is enhanced and the image of the luminance channel divided in the target image.

7. The method of claim 6, wherein the enhancing of the image quality of the image of the luminance channel divided in the target image comprises:
    enhancing the image quality of the image of the luminance channel divided in the target image, using a brightness change relationship derived from the histogram matching.

8. A method for processing an image, the method comprising:

dividing a luminance channel in a reference image and a luminance channel in a target image based on a size of a chroma channel using at least one processor;

converting a color space of the reference image in which the luminance channel is divided and the target image in which the luminance channel is divided;

enhancing an image quality of the target image of which the color space is converted, using the reference image of which the color space is converted;

re-converting the color space of the target image of which the image quality is enhanced to an original color space;

enhancing an image quality of the image of the luminance channel divided in the target image, using the target image of which the color space is re-converted; and combining the luminance channel of the target image of which the image quality is enhanced and the luminance channel of which the image quality is enhanced.

9. The method of claim 8, wherein the dividing of the luminance channel in the reference image and the luminance channel in the target image based on the size of the chroma channel comprises:

dividing the luminance channel in the reference image and the luminance channel of the target image to provide a luminance channel having a size identical to a size of a chroma channel to be included in the reference image and the target image.

10. The method of claim 9, wherein the dividing of the luminance channel in the reference image and the target image based on the size of the chroma channel comprises:

dividing the luminance channel into two luminance channels by sampling components of the luminance channel in an alternating manner.

11. The method of claim 8, wherein the enhancing of the image quality of the target image of which the color space is converted comprises:

enhancing the image quality of the target image of which the color space is converted, using a brightness change relationship between the reference image of which the color space is converted and the target image of which the color space is converted.

12. The method of claim 11, wherein the enhancing of the image quality of the target image of which the color space is converted comprises:

enhancing the image quality of the target image of which the color space is converted, using a brightness change relationship derived from a histogram matching.

13. The method of claim 8, wherein the enhancing of the image quality of the image of the luminance channel divided in the target image comprises:

enhancing the image quality of the image of the luminance channel divided in the target image, using a brightness change relationship between the target image of which the color space is re-converted and the image of the luminance channel divided in the target image.

14. The method of claim 13, wherein the enhancing of the image quality of the image of the luminance channel divided in the target image comprises:

enhancing the image quality of the image of the luminance channel divided in the target image, using a brightness change relationship derived from a histogram matching.

15. An apparatus for processing an image, the apparatus comprising:

a luminance channel divider to divide a luminance channel in a reference image and a luminance channel in a target image based on a size of a chroma channel using at least one processor;

an image quality enhancer to enhance an image quality of the target image in which the luminance channel is divided, using the reference image in which the luminance channel is divided, and enhance an image quality of an image of the luminance channel divided in the target image, using the target image of which the image quality is enhanced; and a luminance channel combiner to combine the luminance channel of the target image of which the image quality is enhanced and the luminance channel of which the image quality is enhanced through being divided in the target image.

16. The apparatus of claim 15, wherein the luminance channel divider divides the luminance channel in the reference image and the luminance channel in the target image to provide a luminance channel having a size identical to a size of a chroma channel to be included in the reference image and the target image.

17. The apparatus of claim 16, wherein the luminance channel divider divides a luminance channel into two luminance channels by sampling components of the luminance channel in an alternating manner.

18. The apparatus of claim 15, the apparatus further comprising:

a color space converter to convert a color space of the reference image in which the luminance channel is divided and the target image in which the luminance channel is divided.

19. The apparatus of claim 18, wherein the image quality enhancer enhances an image quality of the target image of which the color space is converted, using the reference image of which the color space is converted, and enhance an image quality of an image of the luminance channel divided in the target image, using the target image of which the image quality is enhanced 20. The apparatus of claim 15, wherein the apparatus is included in one of a camera, a mobile phone camera, a tablet personal computer, a laptop personal computer, a personal computer, augmented reality glasses including a head mount display or an augmented windshield including an intelligent heads-up display.

* * * * *